June 13, 1967  T. F. SARAH  3,325,115
LINE PICKUP ASSEMBLY FOR SPINNING REELS
Filed Aug. 24, 1965  5 Sheets-Sheet 1

INVENTOR.
THOMAS F. SARAH
BY Hamilton & Cook
ATTORNEYS

June 13, 1967  T. F. SARAH  3,325,115
LINE PICKUP ASSEMBLY FOR SPINNING REELS
Filed Aug. 24, 1965  5 Sheets-Sheet 3

INVENTOR.
THOMAS F. SARAH
BY Hamilton & Cook
ATTORNEYS

INVENTOR.
THOMAS F. SARAH
BY Hamilton & Cook
ATTORNEYS

June 13, 1967            T. F. SARAH            3,325,115

LINE PICKUP ASSEMBLY FOR SPINNING REELS

Filed Aug. 24, 1965            5 Sheets-Sheet 5

INVENTOR.
THOMAS F. SARAH
BY Hamilton & Cook
ATTORNEYS

United States Patent Office 3,325,115
Patented June 13, 1967

3,325,115
LINE PICKUP ASSEMBLY FOR SPINNING REELS
Thomas F. Sarah, Akron, Ohio, assignor to Pflueger Corporation, Akron, Ohio, a corporation of Ohio
Filed Aug. 24, 1965, Ser. No. 482,058
10 Claims. (Cl. 242—84.2)

The present invention relates generally to fishing reels of the spinning type. More particularly, the present invention relates to fishing reels having a normally nonrotatable spool and a radially enclosed flyer to wind the line onto the spool. Specifically, the present invention relates to a radially positionable pickup pin for winding the line onto the spool during the retrieve and the mechanism for its cooperative action with a radially positionable snubbing pin for snubbing the line preparatory to the cast, releasing the line for the cast and selectively snubbing the line after the cast to control the flight thereof.

The spinning reel with its normally nonrotatable spool from which the line uncoils during the cast has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open faced or closed face characteristic refers to the exposure of the spool. The closed reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing rod traveling in almost a straight line and therefore there is little or no opportunity for the line to tangle itself about the line guide on the rod. However, so confining the coils does add to the frictional resistance against the line as it pays out. In open faced reel construction there is either no cover cap at all or the cover cap has an eyelet of relatively large diameter and the coils peeling off of the spool during the cast are not confined within the reel, thus reducing friction at the reel. However, the line is often still in a partial coil as it reaches the first guide line on the rod and the first guide line must therefore be of increased diameter to reduce friction. With open faced reels it is found necessary to provide at least the first line guide with sloping protectors extending from the rod to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top, or upper side, of the rod, he is using an overmounted reel. If the reel is underneath, or on the lower side, of the rod, he is using an undermounted reel.

The finger snubbed reel requires that the fisherman use one or more fingers to engage, or snub, the line both to control the release and flight of the line. Most early spinning reel constructions embodied this concept. However, these constructions generally required the fisherman to use two hands in preparing the reel for the cast. To facilitate the ease of operation, constructions were developed wherein the line was mechanically snubbed by pinching the line between two elements. Such constructions were operative by one hand, but the pinching of the line both to prevent the line from paying off the spool until the desired time in the casting procedure and to snub the line at the desired time after the cast to control the flight subjected the line to serious abrading.

It is therefore an object of the present invention to provide a mechanism capable of snubbing the line preparatory to the cast, releasing the line for the cast and selectively snubbing the line after the cast for controlling the flight without pinching, or otherwise abrading, the line.

It is another object of the present invention to provide a mechanism, as above, whereby the pickup pin is cooperatively radially positionable with a sequentially radially positionable second, or snubbing, pin.

It is yet another object of the present invention to provide a mechanism, as above, for radially extending the pickup pin to engage and wind the line onto the spool during the retrieve and selectively to extend the snubbing pin and withdraw the pickup pin to snub the line preparatory to the cast, to release the line at the cast and selectively to snub the line after the cast for controlling the flight of the line.

It is still another object of the present invention to provide a mechanism for actuating the pickup and snubbing pins, as above, by the fingers of the casting hand.

It is a further object of the present invention to provide a mechanism for actuating the pickup and snubbing pins, as above, which can be as readily used with an open or closed face reel, and undermounted or overmounted reel, and any combination thereof.

It is a still further object of the present invention to provide a mechanism for actuating the pickup and snubbing pins, as above, which is relatively uncomplicated and economical to produce.

These and other objects of the invention, as well as the advantages thereof over existing and prior art forms, will be apparent in view of the following detailed description of the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 1:
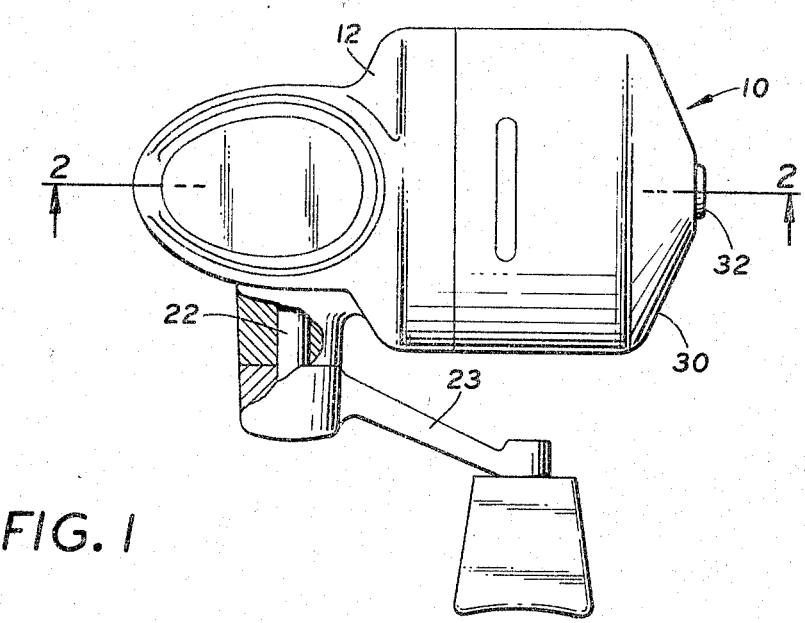
FIG. 1 is a top plan view of a spinning reel embodying the concept of the present invention.

In general, a reel constructed according to the concept of the present invention has a normally nonrotatable spool carried within the housing with a rotatable enclosed flyer mounted adjacent the outer, or line access, side of the spool. The flyer is comprised of a cup-shaped carrier and a holder mounting both a pickup pin and a snubbing pin.

The holder is mounted on the carrier to be slidable from a radially inner to a radially outer position. The pickup pin is affixed to the holder and is extended radially outwardly of the carrier when the holder is in the outer position and is retracted with respect to the carrier when the holder is in the inner position. A latch mechanism retains the holder in the radially inner position but is selectively releasable upon rotation of the flyer to retrieve and wind the line onto the spool.

A snubbing pin is also mounted on the holder and independently movable to be extensible outwardly of and retractable with respect to the carrier. A single biasing means is operatively positioned between the holder and the snubbing pin to urge the holder to the outer position and to urge the snubbing pin to the retracted position.

A plunger is axially slidably mounted in the housing and operative by control means from exteriorly of the housing to move the holder to the inner position and the snubbing pin to extended position against the action of the single biasing means.

Upon release of the control means the aforesaid biasing means also causes the plunger to move out of contact with both the holder and the snubbing means.

Referring more particularly to the drawings, the improved reel, indicated generally by the numeral 10, is detachably mounted to a rod, not shown, in the well-known manner by a mounting shoe 11 spaced outwardly of the housing 12.

The housing 12 is divided by an integral partition wall 13 into a gear compartment 14 and a spool compartment 15. A cover plate, not shown, on the side of the rear, preferably flattened, portion of the housing containing the gear compartment 14 provides access thereto.

Fixed to and extending forwardly of the partition wall 13 is a tubular bearing 16. Interiorly of the bearing 16 a drive shaft 18 is mounted for rotation. Exteriorly of the bearing 16 a line spool 19 is supported. The line spool is generally nonrotatable but may be selectively rotatable against the action of the drag mechanism, not shown, or may also be axially slidable in conjunction with a level wind mechanism, also not shown.

The rear portion of the drive shaft extends through the partition wall 13 into the gear compartment 14 and mounts a bevel pinion 20 thereon. A bevel drive gear 21 meshes with pinion 20 and is mounted on a shaft 22 for rotation by the crank handle 23. The usual brake means and anti-reversing pawls may also be used, but since they form no part of the present invention and are not necessary to an environmental understanding of the present invention, they have not been depicted.

A flyer, indicated generally by the numeral 24, is fixedly mounted on the forward end of the drive shaft 18 for rotation therewith. Specifically, the base 25 of the cup-shaped carrier 26 is swaged to, or otherwise suitably attached to, a plug 27 screwed onto the drive shaft 18 for ease of assembly. The skirt 28 of the carrier 26 extends rearwardly over the front flange 29 of the spool 19.

A cap 30 is attached to the housing 12 to complete the spool compartment 15. The cap 30 may be attached to the housing in a number of ways. For example. it may be screwed onto the annular flange 31, as shown. The forward portion of the cap 30 is provided with a line guide, or eyelet, 32. The purpose of the eyelet 32 is merely to guide the line inwardly and outwardly of the spool compartment 15 and may therefore be of relatively small diameter, as shown, or may, if preferred, be of much larger diameter.

The above-described structure is well-known to the art and forms no part of the present invention, the description being set forth merely to provide an environmental understanding.

In addition to the carrier 26 the flyer 24 comprises a unique holder 33 on which are carried the pickup pin 34 and the snubbing pin 35.

Figure 9:
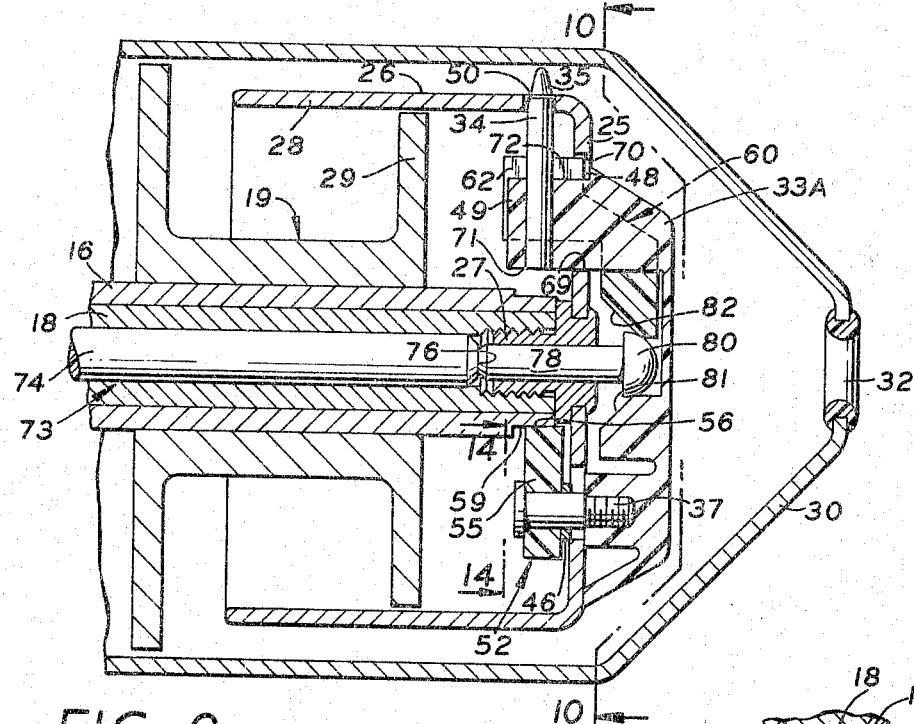
FIG. 9 is a view similar to FIG. 3 depicting the pickup pin retracted and the snubbing pin extended.
Figure 11:
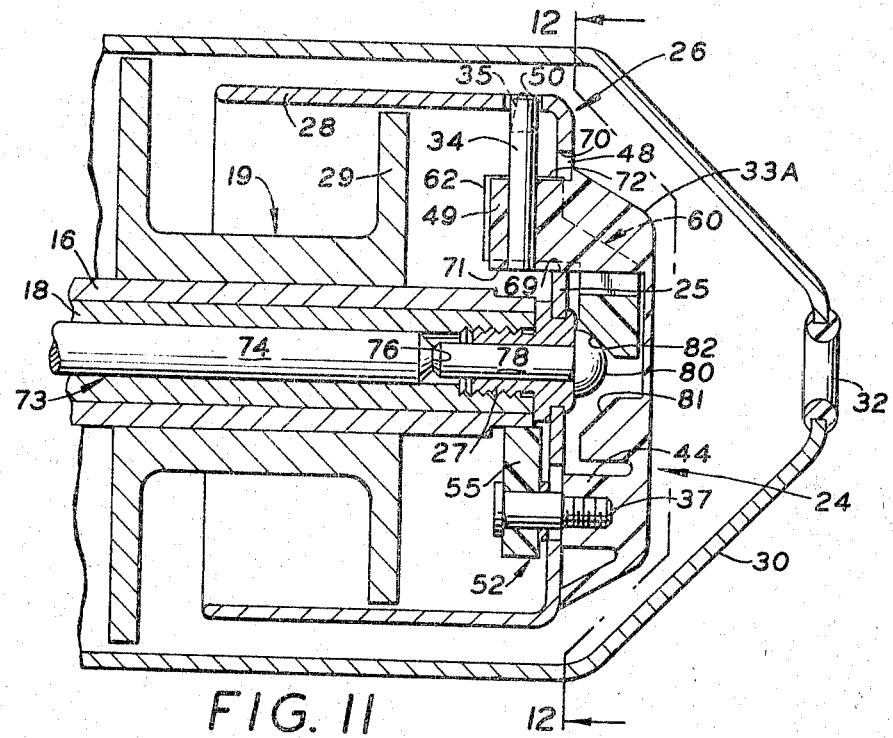
FIG. 11 is a view similar to FIGS. 3 and 9 depicting both the pickup pin and the snubbing pin retracted.

The holder 33 is secured to the forward face of the base 25 of carrier 26 by a plurality of cap screws 36, 37 and 38. The shanks of the screws 36, 37 and 38 pass through an equal number of parallel elongated guide slots 40, 41 and 42, respectively, in the base 25 of carrier 26 to anchor in bosses 43, 44 and 45 in the holder 33 and thereby secure the holder 33 to the carrier. The washer 46 on the shank of each screw 36, 37 and 38 is of greater diameter than the lateral span of the slots 40, 41 and 42 to engage the base 25 of the carrier between the washers 46 and the bosses 43, 44 and 45 sufficiently to mount the holder 33 on the carrier 26 but not so tightly as to prevent radial translation of the holder 33 with respect to the carrier 26 in the direction of the slots 40, 41 and 42. With such an arrangement the holder can slide between the radially inner position 33A depicted in FIGS. 9 and 11 and the radially outer position 33B depicted in FIG. 3.

Figure 3:
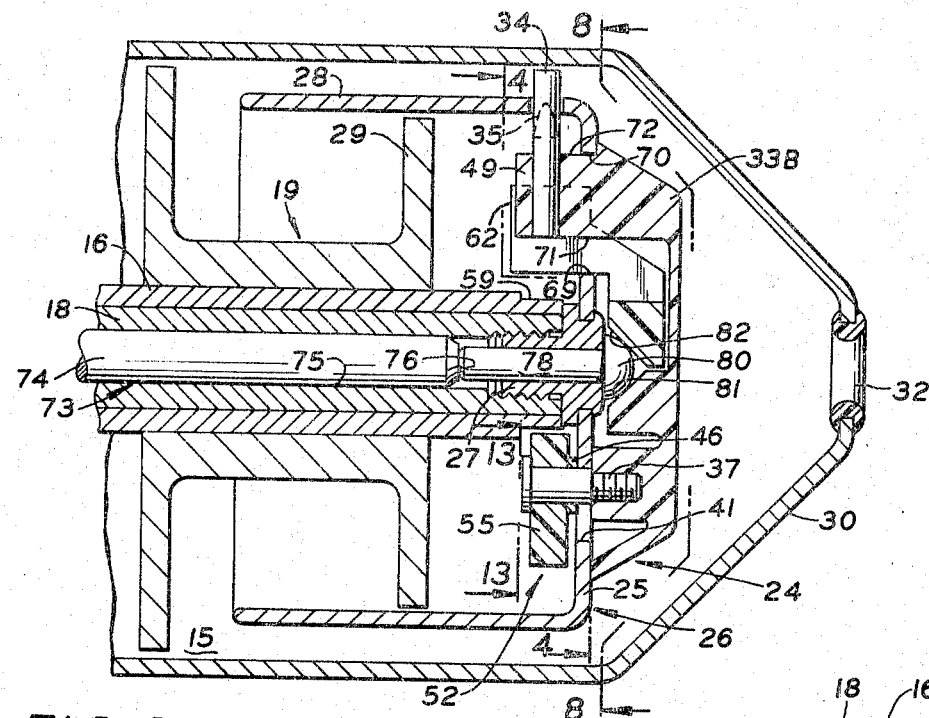
FIG. 3 is a further enlarged fragmentary area of FIG. 2 depicting the pin holder in the radially outer position with the pickup pin extended.

On the diametrically opposed side of the flyer shaft 18 from the guide slot 41 an access opening 48 is provided in the base 25 of carrier 26. Received through the opening 48 is a spur 49 which extends rearwardly from the holder 33. The pickup pin 34 is mounted in and extends radially outwardly of spur 49 through a bore 50 in the skirt 28 of carrier 26. The pickup pin 34 normally extends radially outwardly of the carrier 26, as shown in FIG. 3, by the action of a spring means 51 more fully hereinafter described.

A latch mechanism 52 is carried on the cap screw 37 for retaining the holder in the radially inner position 33A against the biasing action of spring means 51 and for selectively releasing said holder. While no particular latch construction is critical to the operation of the subject pickup pin assembly, that shown in my Patent No. 3,226,-051, has proven highly efficient. Reference to the aforesaid patent may be had for a detailed description of that latch mechanism.

Figure 13:
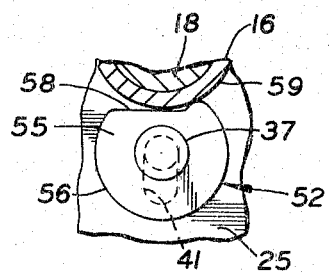
FIG. 13 is a cross section taken substantially on line 13—13 of FIG. 3.
Figure 4:
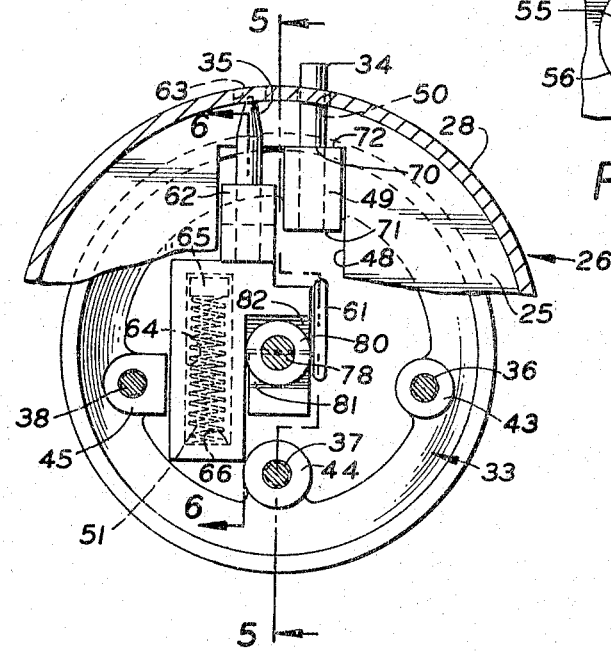
FIG. 4 is a cross section taken substantially on line 4—4 of FIG. 3 depicting the holder in rear elevation.
Figure 6:
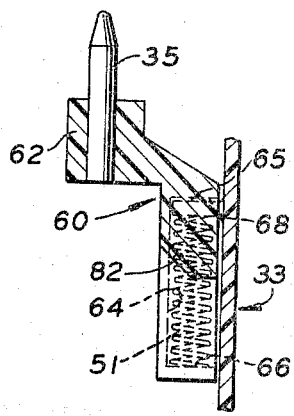
FIG. 6 is a still further cross section taken substantially on line 6—6 of FIG. 4.
Figure 5:
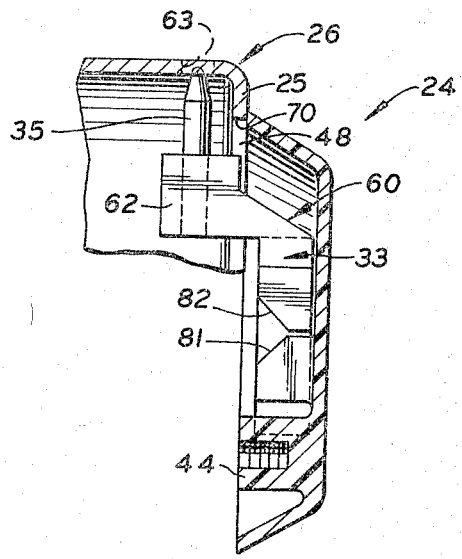
FIG. 5 is a further cross section taken substantially on line 5—5 of FIG. 4.
Figure 14:
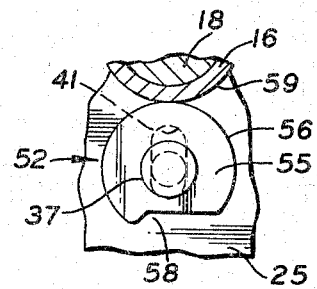
FIG. 14 is a cross section similar to FIG. 13 taken substantially on line 14—14 of FIG. 9.

Briefly, however, such a latch mechanism comprises a lock drum 55 mounted on the cap screw 37 to be slidable with the holder 33 and independently rotatable. As best seen in FIGS. 13 and 14, the lock drum 55 has an annular periphery 56 with a relieved portion 58. The periphery of the drum 55 is cooperatively positioned radially of a blocking means formed by the forwardmost radial surface 59 of the bearing 16. When the holder is in the radially outer position 33B the relieved portion 58 is disposed opposite the radial surface 59 (FIG. 13), and when the holder is moved from the outer position 33B to the inner position 33A, the lock drum is rotated, as by a coil spring not shown, until the annular periphery 56 engages said bearing 16 (FIG. 14). This maintains the holder in the inner position 33A against the biasing action of spring 51. Upon rotation of the carrier 26 separate means, such as a frictional engagement between the lock drum 55 and the bearing 16, drivingly rotates the drum 55 until the relieved portion 58 is disposed opposite bearing 16 and the spring 51 can force the holder to the radially outer position 33B.

Figure 8:
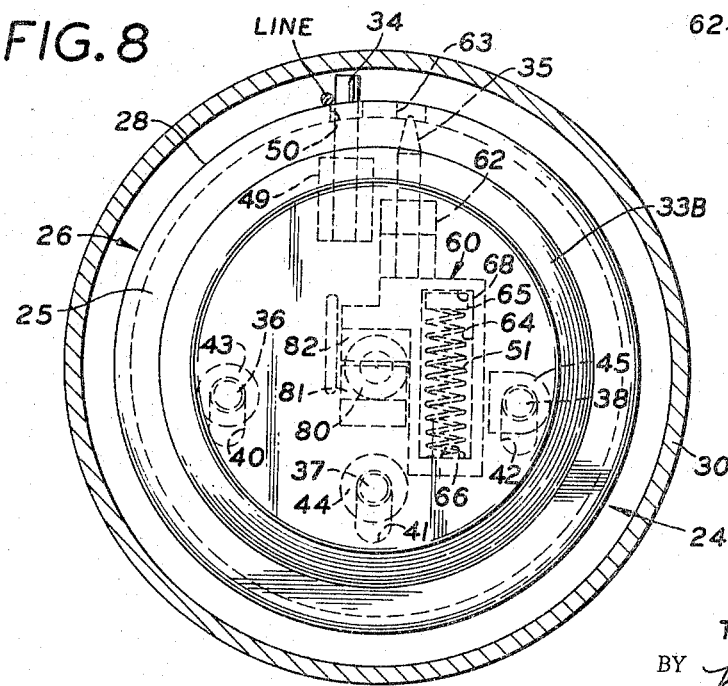
FIG. 8 is a cross section taken substantially on line 8—8 of FIG. 3.
Figure 7:
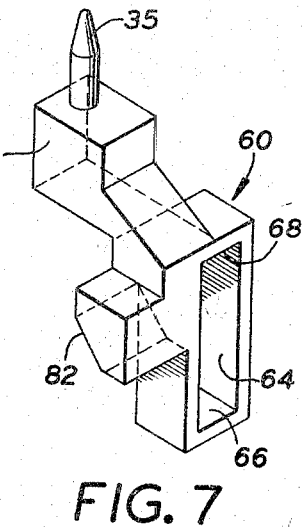
FIG. 7 is a perspective view of the snubbing pin block.

A pin block 60 is slidably received between parallel way flanges 61, only one of which is illustrated, extending rearwardly into the hollowed pin holder 33 and oriented parallel to the axes of the slots 40, 41 and 42. A second spur 62 extends rearwardly from the pin block 60 and is also received through the access opening 48 in the base 25 of carrier 26. The snubbing pin 35 is mounted in and extends radially outwardly of spur 62 through a bore 63 in the skirt 28 of carrier 26, as best shown in FIG. 8.

The body of the pin block 60 is provided with a recess 64 into which extends an anchor lug 65 attached to the holder 33. The recess 64 is depicted as being rectangular with its longer dimension generally parallel to the axes of the parallel way flanges 61 and the guide slots 40, 41 and 42 to permit reciprocal movement of the lug 65 within the recess 64.

One end 66 of the recess 64 also serves as an anchor so that the spiral compression spring is compressed between the anchor lug 65 and the anchor end 66.

The opposite end 68 of recess 64 forms a stop means against which the lug 65 abuts to limit the relative movement between the holder 33 and the pin block 60 in the direction the block 60 is urged by spring 51. The inner and outer side surfaces 69 and 70 on access opening 48, respectively, control the radially innermost and radially outermost extent, respectively, to which the holder 33 can move with respect to the carrier 26 by engagement with the corresponding edges 71 and 72 on spur 49.

The plunger 73 by which the pickup pin 34 and the snubbing pin 35 are actuated has a rod 74 which is slidably received in a bore 75 through the drive shaft 18. For ease of assembly the plunger rod 74 is separable, as at 76, from a forward work portion 78 slidably received through plug 27 and axially aligned with the rearwardly positioned rod 74. The plunger head 80 is located on the forward end of the work portion 78 forwardly of the base 25 of carrier 26 cooperatively engageable with a pair of opposed beveled work surfaces 81 and 82.

Work surface 81 is formed on holder 33 and is positioned on the opposite side of the drive shaft 18 from the pickup pin 34 so that axial forward displacement of the head 80 engages the work surface 81 to slide the holder to the radially inner position 33A.

Work surface 82 is formed on the pin block 60 and is positioned on the same side of the shaft 18 as the snubbing pin 35 so that axial forward displacement of the head 80 engages the work surface 82 to extend the snubbing pin 35 radially outwardly of the skirt 28 on carrier 26.

Figure 2:
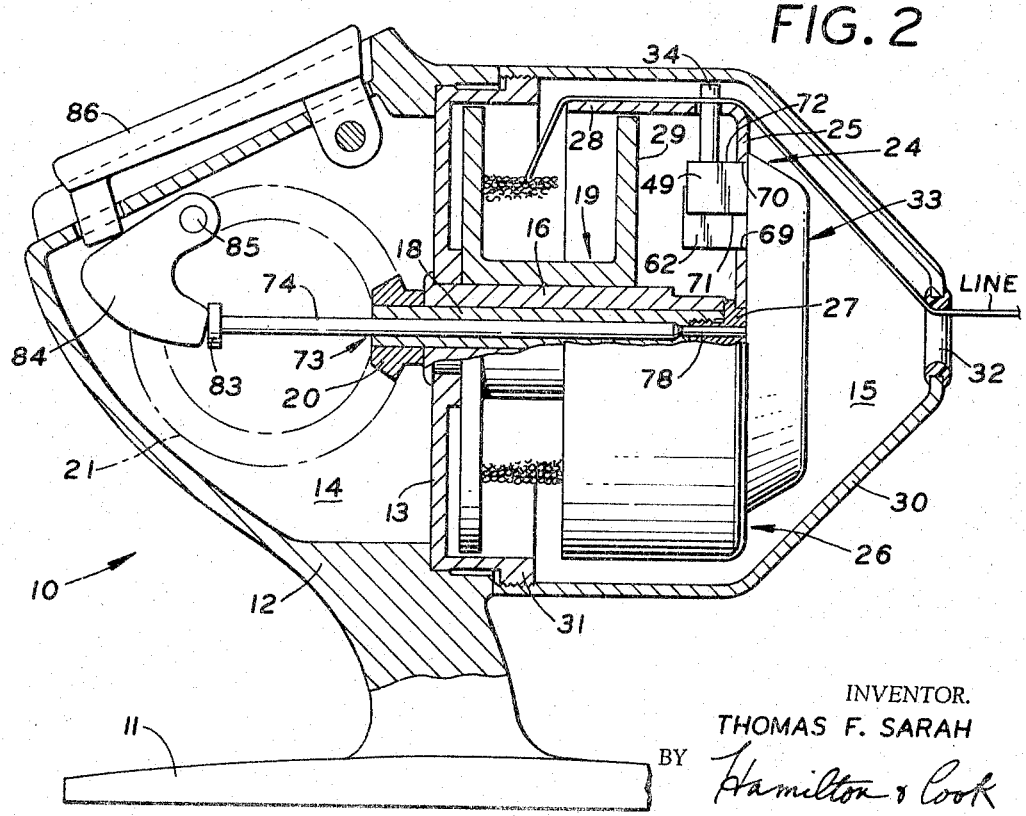
FIG. 2 is an enlarged cross section taken substantially on line 2—2 of FIG. 1.

As best seen in FIG. 2, the rearmost end 83 of the plunger rod 74 is engaged by a lever arm 84 rockably mounted on a stud shaft 85 in the gear compartment 14 so as to be actuated by a push button 86 mounted to be operative from exteriorly of the housing 12. The control means comprising the push button 86 and the lever arm 84 operate to move the plunger head 80 forwardly against the rearward biasing action of spring 51.

As should now be readily apparent, the spring 51 performs multiple functions. It is located to urge the holder 33 and the snubbing pin block 60 in opposite directions, and, because the anchor end 66 of recess 64 is positioned on the side of the anchor lug 65 oppositely of said pickup pin 34 and snubbing pin 35 this oppositely imparted urging of the holder 33 and block 60 not only tends to urge the holder 33 toward its outer position 33B and the snubbing pin 35 toward its retracted position, but also tends to drive the plunger head 80 rearwardly.

Figure 10:
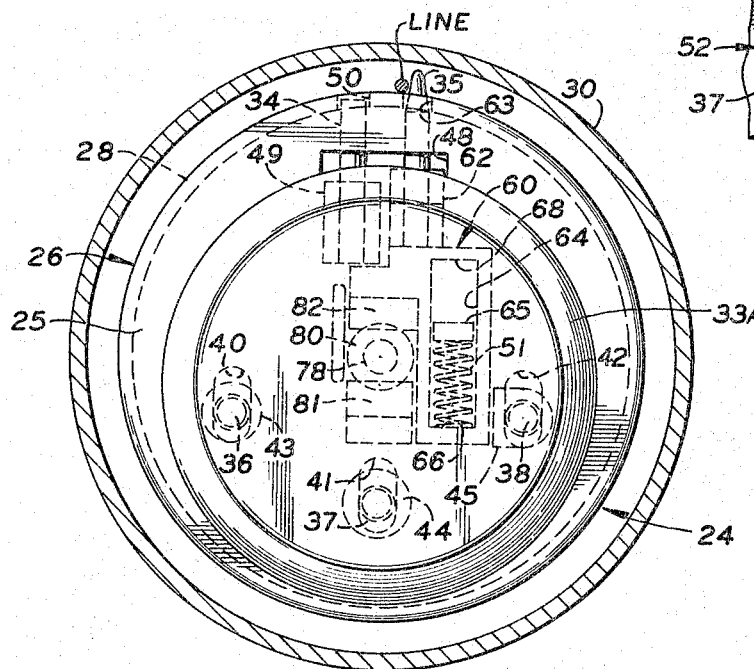
FIG. 10 is a cross section taken substantially on line 10—10 of FIG. 9.

A fisherman would operate this reel as follows: To prepare the reel for casting a lure the fisherman would apply pressure to the push button 86. This moves the plunger head 80 forwardly against the work surfaces 81 and 82. Engagement of head 80 with work surface 81 slides the holder 33 to the inner position 33A where it is locked by latch mechanism 52, retracting the pickup pin 34. At the same time, the engagement of the head 80 with work surface 82 extends the snubbing pin 35. Thus, the line, so marked, is released from engagement with pickup pin 34 (FIG. 8) and is snubbed by snubbing pin 35 (FIG. 10).

The pressure against push button 86 which initiated the above sequence is maintained until the moment during the cast when the fisherman desires to release the line. By releasing his pressure against the button 86, the spring 51 biases the snubbing pin 35 to retracted position within the carrier skirt 28, as shown in FIG. 12, and the line can freely uncoil, or peel, off the spool 19.

If desired, the fisherman may stop the cast at any time during the flight of the lure simply by again depressing the button 86 and thereby moving the plunger head 80 forwardly against the work surface 82. The cooperative action therebetween extends the snubbing pin 35 radially outwardly of the skirt 28 to snub the line and limit the extent on the cast.

Figure 12:
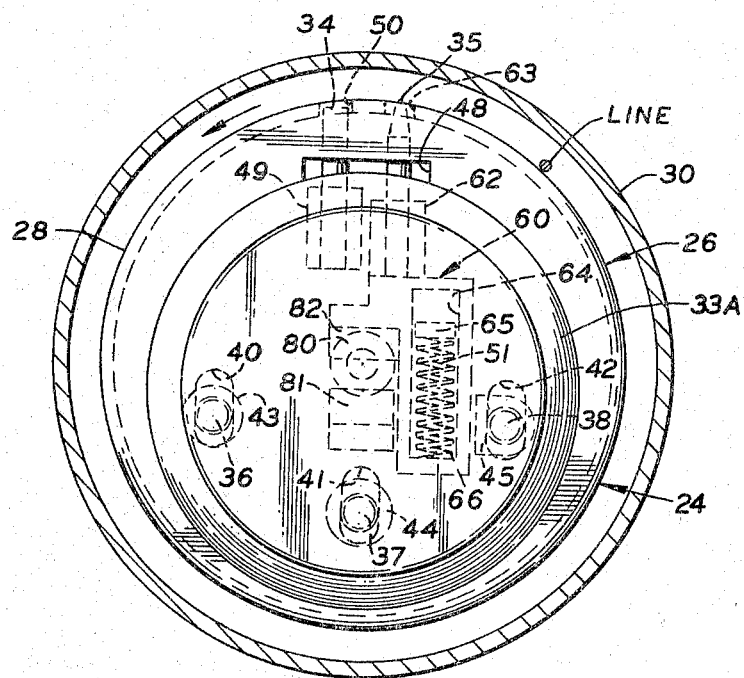
FIG. 12 is a cross section taken substantially on line 12—12 of FIG. 11.

When rewinding is started by turning the crank handle 23, the drive shaft 18 rotates the flyer 24 in the direction of the arrow in FIG. 12. The annular periphery 56 of the lock drum "walks" around the radial surface 59 of fixed bearing 16 until the relieved portion 58 is disposed oppositely thereto. At that point the spring 51 moves the holder 33 from the inner position 33A to the outer position 33B, and thus extends the pickup pin 34 radially outwardly of the carrier skirt 28 so that continued rotation of the crank handle 23 causes the pickup pin 34 to wind the line onto the spool 19.

It is therefore apparent that a spinning reel constructed according to the concept of the present invention provides an inexpensive mechanism for snubbing, releasing and winding the line without danger of abrading the line and otherwise accomplishes the objects of the invention.

What is claimed is:

1. In a spinning reel having a housing, a normally nonrotatable line spool, a carrier adjacent said spool and fixed to a selectively rotatable shaft, a holder mounted on said carrier and slidable between a radially inner and radially outer position, a pickup pin affixed to said holder, said pickup pin extending radially outwardly of said carrier when said holder is in outer position and retracted with respect to said carrier when said holder is in inner position, a latch mechanism for retaining the holder in said inner position and selectively releasing said holder, a snubbing pin movably mounted in said holder and extensible outwardly of and retractable with respect to said carrier, biasing means mounted between and urging said holder and said snubbing pin in opposite direction, a plunger carrier by said housing, and control means operative from exteriorly of said housing for moving said plunger to engage and slide said holder to said radially inner position in opposition to the action of said biasing means.

2. In a spinning reel having a housing, a normally nonrotatable line spool, a carrier adjacent said spool and fixed to a selectively rotatable shaft, a holder mounted on said carrier and slidable between a radially inner and radially outer position, a pickup pin affixed to said holder, said pickup pin extending radially outwardly of said carrier when said holder is in outer position and retracted with respect to said carrier when said holder is in inner position, latch mechanism for retaining the holder in said inner position and selectively releasing said holder, a snubbing pin movably mounted in said holder, a plunger carried by said housing, control means operative from exteriorly of said housing for moving said plunger in one direction to engage and slide said holder to the radially inner position and move the snubbing pin to a position extending outwardly of said carrier, and biasing means between said holder and said snubbing pin to urge said holder to said outer positions, retract said snubbing pin and move said plunger in a direction oppositely that caused by actuation of said control means.

3. In a spinning reel having a housing, a tubular bearing stationarily secured to said housing, a normally nonrotatable spool mounted exteriorly of said bearing, a drive shaft rotatably mounted through said bearing, a carrier mounted on said shaft adjacent said pool, a plunger axially slidably mounted within said drive shaft, a holder carrying line pickup means mounted on said carrier and slidable between a radially inner and radially outer position, a latch mechanism for retaining the holder in said inner position and selectively releasing said holder, a snubbing pin slidably mounted in said holder, control means operative from exteriorly of said housing for moving said plunger in one direction to engage and slide said holder to the radially inner position and move the snubbing pin to a position extending outwardly of said carrier, and biasing means between said holder and said snubbing pin to urge said holder to said outer position, retract said snubbing pin and move said plunger in a direction oppositely that caused by actuation of said control means.

4. In a spinning reel having a housing, a tubular bearing stationarily secured to said housing, a normally non-rotatable spool mounted exteriorly of said bearing, a drive shaft rotatably mounted through said bearing, a carrier mounted on said shaft adjacent said spool, a plunger axially slidably mounted within said drive shaft, a holder mounted on said carrier and slidable between a radially inner and radially outer position, a pickup pin affixed to said holder, a latch mechanism for retaining the holder in said inner position and selectively releasing said holder, a snubbing pin, said snubbing pin slidable axially of itself inwardly and outwardly of the carrier and supported on said holder in substantially parallel relation to said pickup pin, a first stop means to limit the outward sliding movement of said snubbing pin, a second stop means to limit the inward sliding movement of said snubbing pin, control means operative from exteriorly of said housing for moving said plunger in one direction to engage and slide said holder to the radially inner position and move the snubbing pin to a position extending outwardly of said carrier, and biasing means between said holder and said snubbing pin to urge said holder to said outer position, retract said snubbing pin and move said plunger in a direction oppositely that caused by actuation of said control means.

5. A spinning reel, as set forth in claim 4, in which the first stop means is attached to said holder and the second stop means is radially fixed with respect to said housing.

6. A spinning reel, as set forth in claim 5, in which the pickup pin has a work surface engageable by said plunger diametrically opposed to a work surface for said snubbing pin also engageable by said plunger.

7. In a spinning reel having a housing, a tubular bearing stationarily secured to said housing, a normally non-rotatable spool mounted exteriorly of said bearing, a drive shaft rotatably mounted through said bearing, a radially enclosed carrier mounted on said shaft adjacent said spool, an axially slidable plunger supported in said housing, a holder mounted on said carrier and slidable between a radially inner and radially outer position, a pickup pin affixed to said holder, a latch mechanism for retaining the holder in said inner position and selectively releasing said holder, a first anchor means attached to said holder, a snubbing pin, said snubbing pin mounted on said holder in substantially parallel relation to said pickup pin and slidable between an inner and outer position, a second anchor means attached to said snubbing pin on the side of said first anchor means oppositely said pickup and snubbing pins, spring means between said first and second anchor means urging them apart, control means operative from exteriorly of said housing for moving said plunger in one direction to engage and slide said holder to the radially inner position and move the snubbing pin to a position extending outwardly of said carrier.

8. In a spinning reel having a housing, a tubular bearing stationarily secured to said housing, a normally non-rotatable spool mounted exteriorly of said bearing, a drive shaft rotatably mounted through said bearing, a radially enclosed carrier mounted on said shaft adjacent said spool, a plunger axially slidably mounted within said drive shaft, a holder mounted on said carrier and slidable between a radially inner and radially outer position, a latch mechanism for retaining the holder in said inner position and selectively releasing said holder, a first anchor means attached to said holder, a snubbing pin, said snubbing pin independently axially slidably mounted on said holder in substantially parallel relation to said pickup pin, a second anchor means attached to said snubbing pin on the side of said first anchor means oppositely said pickup and snubbing pins, spring means between said first and second anchor means urging them apart, a first stop means to limit the outward sliding movement of said snubbing pin, a second stop means to limit the inward sliding movement of said snubbing pin, control means operative from exteriorly of said housing for moving said plunger in one direction to engage and slide said holder to the radially inner position and move the snubbing pin to a position extending outwardly of said carrier.

9. A spinning reel, as set forth in claim 8, in which the first stop means is attached to said holder and a second stop means is radially fixed with respect to said housing.

10. A spinning reel, as set forth in claim 9, in which the holder has a work surface diametrically opposed to a work surface attached to said snubbing pin, both said work surfaces engageable by said plunger upon movement thereof in response to actuation of said control means.

References Cited
UNITED STATES PATENTS

| | | | |
|---|---|---|---|
| 3,108,762 | 10/1963 | Murvall | 242—84 |
| 3,142,454 | 7/1964 | Hull | 242—84 |
| 3,284,019 | 11/1966 | Wood | 242—84 |

FRANK J. COHEN, *Primary Examiner.*

B. S. TAYLOR, *Assistant Examiner.*

UNITED STATES PATENT OFFICE
CERTIFICATE OF CORRECTION

Patent No. 3,325,115                June 13, 1967

Thomas F. Sarah

It is hereby certified that error appears in the above numbered patent requiring correction and that the said Letters Patent should read as corrected below.

Column 1, line 43, for "construction" read -- constructions --; column 6, line 41, for "direction" read -- directions --; line 71, for "pool" read -- spool --; column 8, line 19, after "position," insert -- a pickup pin affixed to said holder, --.

Signed and sealed this 18th day of March 1969.

(SEAL)
Attest:

Edward M. Fletcher, Jr.            EDWARD J. BRENNER
Attesting Officer                 Commissioner of Patents